United States Patent
Park et al.

(10) Patent No.: US 8,610,676 B2
(45) Date of Patent: Dec. 17, 2013

(54) STYLUS PEN WITH A REFLECTING UNIT AND FLAT PANEL DISPLAY APPARATUS INCLUDING THE SAME

(75) Inventors: Sung-Un Park, Yongin (KR); Tae-Jin Kim, Yongin (KR); Joo-Hyeon Jeong, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 574 days.

(21) Appl. No.: 12/585,031

(22) Filed: Sep. 1, 2009

(65) Prior Publication Data

US 2010/0141593 A1 Jun. 10, 2010

(30) Foreign Application Priority Data

Dec. 10, 2008 (KR) ........................ 10-2008-0125324

(51) Int. Cl.
*G06F 3/041* (2006.01)

(52) U.S. Cl.
USPC .......................................... 345/173; 345/179

(58) Field of Classification Search
USPC .................................. 345/173, 179
See application file for complete search history.

(56) References Cited

U.S. PATENT DOCUMENTS

| 3,184,242 | A | * | 5/1965 | Marcucci et al. | ............. | 369/173 |
| 7,181,105 | B2 | | 2/2007 | Teramura et al. | | |
| 2002/0014893 | A1 | * | 2/2002 | Shimomura et al. | .......... | 324/756 |
| 2005/0104870 | A1 | * | 5/2005 | Jurisch et al. | ................. | 345/179 |
| 2005/0146517 | A1 | * | 7/2005 | Robrecht et al. | ............. | 345/179 |

FOREIGN PATENT DOCUMENTS

| JP | 2005-038309 A | | 2/2005 |
| JP | 2005038309 A | * | 2/2005 |
| JP | 2006-227907 A | | 8/2006 |
| JP | 2006227907 A | * | 8/2006 |
| KR | 10-2004-0084851 A | | 10/2004 |
| KR | 10-2005-0077230 A | | 8/2005 |

OTHER PUBLICATIONS

Japanese Office Action in JP 2009-278678, dated Sep. 13, 2011 (Park, et al).

\* cited by examiner

*Primary Examiner* — Kwang-Su Yang
(74) *Attorney, Agent, or Firm* — Lee & Morse, P.C.

(57) ABSTRACT

A stylus pen includes a body portion, and an end portion on the body portion, the end portion including a reflecting unit and adapted to contact a touch screen. The reflecting unit is adapted to reflect light toward a display apparatus including the stylus pen, so light receiving accuracy of a photosensor in the display apparatus is increased.

16 Claims, 4 Drawing Sheets

STYLUS PEN WITH A REFLECTING UNIT AND FLAT PANEL DISPLAY APPARATUS INCLUDING THE SAME

BACKGROUND

1. Field

Example embodiments relate to a stylus pen and a flat panel display apparatus including the stylus pen. More particularly, example embodiments relate to a stylus pen capable of increasing the light receiving accuracy of a photosensor of a flat panel display apparatus, and a flat panel display apparatus including the same.

2. Description of the Related Art

Display devices may include portable thin and flat panel displays. In particular, the flat panel displays may include display panels with a touch screen function therein. That is, research with the aim of increasing user convenience by realizing touch screen function in the display panel has been conducted, wherein a user can input commands by touching a touch screen with a stylus pen. Such display panels may include a photosensor to detect contact of the stylus pen via detected amount of light.

However, display panels with a conventional touch screen function may not detect contact of the conventional stylus pen efficiently when an amount of light surrounding the stylus pen and the display panel is low, i.e., relatively low detection of the photosensor in low-light environments. Attempts have been made to overcome this problem by emitting internal light of the flat display panel externally in order to increase the amount of light surrounding the stylus pen and the panel display. However, in the conventional flat panel display that emits internal light toward the conventional stylus pen, a large amount of the internal light may be absorbed by the stylus pen. Therefore, there may still not have sufficient light for the photosensor in the conventional panel display to efficiently detect contact between the display panel and the stylus pen at a reliable level. Accordingly, when a user touches a conventional display panel, i.e., screen, the display panel may not sense the touch or may cause malfunctions such that a defect rate of products may increase and user convenience may decrease.

SUMMARY

Embodiments are therefore directed to a stylus pen and a flat panel display apparatus including the same, which substantially overcome one or more of the problems due to the limitations and disadvantages of the related art.

It is therefore a feature of an embodiment to provide a stylus pen structure capable of increasing an amount of light surrounding it.

It is therefore another feature of an embodiment to provide a flat panel display with a stylus pen structure capable of increasing an amount of light detected by a photosensor in the flat panel display.

At least one of the above and other features and advantages may be realized by providing a stylus pen, including a body portion and an end portion for contacting a touch screen, wherein the end portion includes a reflecting unit. The reflecting unit may have a reflective surface. The reflecting unit may be oriented to have the body portion and reflective surface at opposite edges thereof. The entire reflective surface may be reflective. The reflective surface may be positioned at non-right angles with respect to side surfaces of the reflecting unit, the side surfaces of the reflecting unit extending from the body portion and being adjacent the reflective surface. The reflective surface may be asymmetric.

When the end portion of the stylus pen touches a touch screen, the reflecting unit may reflect at least some light, which is emitted from an inside of a device with the touch screen, into an inside of the device with the touch screen.

The reflecting unit may have a flat surface whereby, when the end portion of the stylus pen contacts a touch screen, the flat surface of the reflecting unit may be in surface contact with a surface of the touch screen.

The reflecting unit may have a concave surface whereby, when the end portion of the stylus pen contacts a touch screen, the concave surface of the reflecting unit may converge at least some light, which is emitted from an inside of a device with the touch screen, and may reflect the at least some light into an inside of the device with the touch screen.

At least one of the above and other features and advantages may also be realized by providing a flat panel display apparatus including a flat display panel with a touch screen, wherein the flat display panel includes a self light emitting device and a photosensor; and a stylus pen including an end portion for contacting a touch screen, wherein the end portion includes a reflecting unit.

The reflecting unit may have a reflective surface.

When the end portion of the stylus pen contacts the touch screen, the reflecting unit may reflect at least some light, which is emitted by the self light emitting device, into the inside of the flat display panel so as to be sensed by the photo sensor.

The reflecting unit may have a flat surface whereby, when the end portion of the stylus pen contacts the touch screen, the flat surface of the reflecting unit may be in surface contact with a surface of the touch screen.

The reflecting unit may have a concave surface whereby, when the end portion of the stylus pen contacts the touch screen, the concave surface of the reflecting unit may converge at least some light, which is emitted from the self light emitting device of the flat display panel, may reflect the at least some light into the flat display panel, and may allow the photosensor to sense at least some of the reflected light. Upon contact between the stylus pen and the touch screen, an entire edge of the reflective surface may contact the touch screen. Upon contact between the stylus pen and the touch screen, the entire reflective surface may face the touch screen. The entire reflective surface may be concave between side surfaces of the reflecting unit, the side surfaces of the reflecting unit extending from the body portion and being adjacent the reflective surface.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
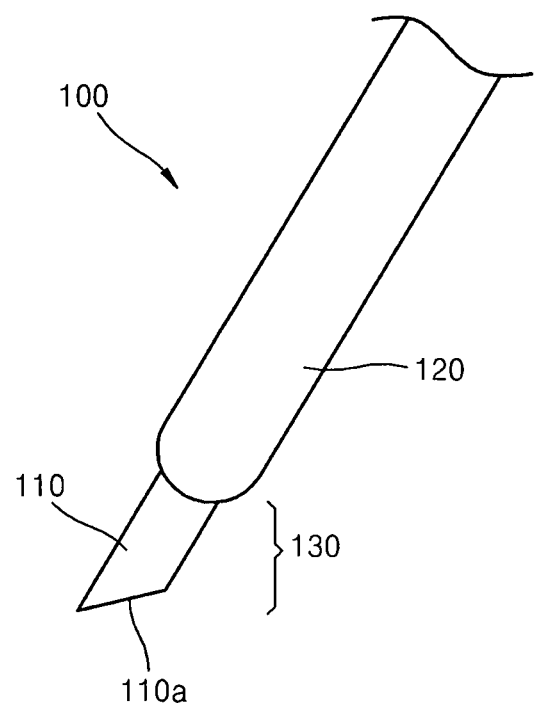
FIG. 1 illustrates a perspective view of a part of a stylus pen according to an embodiment.

Korean Patent Application No. 10-2008-0125324, filed on Dec. 10, 2008, in the Korean Intellectual Property Office, and entitled: "Stylus Pen and Flat Panel Display Apparatus Including the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a perspective view of a part of a stylus pen 100 according to an embodiment. Referring to FIG. 1, the stylus pen 100 may have a body portion 120 and an end portion 130 on the body portion 120. The end portion 130 may be on an edge of the body portion 120 for contacting a touch screen. The end portion 130 may include a reflecting unit 110. The reflecting unit 100 may include a reflective material, e.g., an entire surface of the reflecting unit 110 may be reflective. Accordingly, when a display screen (i.e., a touch screen) of a flat panel display apparatus with a touch screen function is touched using the stylus pen 100, a majority of light emitted from an inside of the display apparatus toward the stylus pen 100 may be incident on the reflecting unit 110 of the end portion 130 of the stylus pen 100 and may be reflected from the reflecting unit 110 back toward the display apparatus with the touch screen.

In contrast, when a conventional stylus pen does not include the reflecting unit 110, light emitted from an inside of the display apparatus may be absorbed by an end portion of the conventional stylus pen. Thus, an amount of light surrounding the conventional stylus pen may be insufficient to allow a photosensor in a display apparatus to perform a sensing operation.

Therefore, when the stylus pen 100 according to an embodiment is used, since the stylus pen 100 includes the reflecting unit 110 in the end portion, light emitted from the display apparatus and incident on the end portion of the stylus pen 100 may not be absorbed by the end portion of the stylus pen 100 but may be efficiently reflected from the reflecting unit 110. By doing so, the amount of light reflected from the reflecting unit 110 of the stylus pen 100 toward the display apparatus may be substantially increased, e.g., as compared to a display apparatus with a conventional stylus pen having no reflecting unit. Therefore, a photosensor inside the display apparatus may more accurately sense the light surrounding the stylus pen 100, e.g., light reflected back from the stylus pen 100 and incident on the display apparatus, and changes thereof, thereby having improved detection capabilities of a contact between the stylus pen 100 and the screen of the display apparatus and the position of the contact on the screen.

In particular, as illustrated in FIG. 1, the reflecting unit 110 of the stylus pen 100 may include a reflective surface 110a. The reflective surface 110a may be substantially flat, e.g., the entire reflective surface 110a may be substantially flat. For example, the reflecting unit 110 may be positioned so the reflective surface 110a and the body portion 120 may be at opposite edges of the reflecting unit 110. For example, upon holding the stylus pen 100 in front of a screen, the reflective surface 110a may face the screen and may be a closest surface of the reflecting unit 110 to the screen. For example, during contact between the stylus pen 100 and the screen, the reflective surface 110a may contact the screen, e.g., the entire reflective surface 110 may be directly on the screen. Therefore, light emitted from the display apparatus may be incident on the end portion of the stylus pen 100 and may be efficiently reflected from the reflective surface 110a of the reflecting unit 110 toward the display apparatus. In particular, by having the reflecting unit 110 with the substantially flat reflective surface 110a, as illustrated in FIG. 1, when the end portion of the stylus pen 100 contacts a touch screen, the reflective surface 110a of the reflecting unit 110 may be flat against the surface of the touch screen. By allowing the flat reflective surface 110a of the reflecting unit 110 to be flat against the surface of the touch screen when the end portion of the stylus pen 100 contacts the touch screen, the reflective surface 110a of the end portion of the stylus pen 100 may closely contact the surface of the touch screen so that the light incident on the end portion of the stylus pen 100 may be reflected from the end portion into the display apparatus without being externally dispersed.

Figure 2:
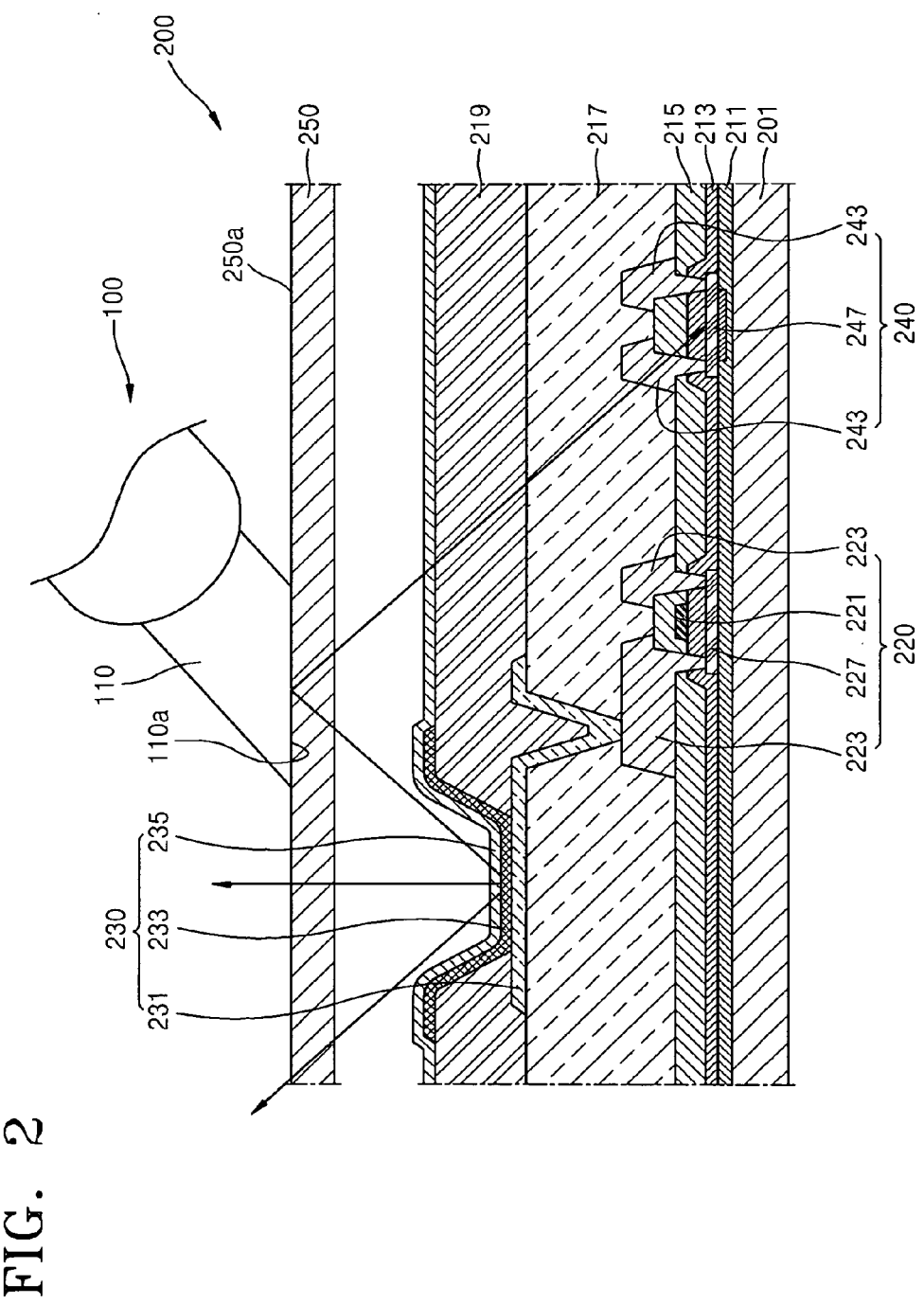
FIG. 2 illustrates a cross-sectional view of a part of a flat panel display apparatus according to an embodiment.

FIG. 2 illustrates a cross-sectional view of a part of a flat panel display apparatus according to an embodiment. Referring to FIG. 2, the flat panel display apparatus may include a display panel 200 with touch screen and the stylus pen 100. The display panel 200 may include a self light emitting device 230 and a photosensor 240. The stylus pen 100 may have the end portion for contacting the touch screen of the display panel 200, wherein the end portion may include the reflecting unit 110.

The display panel 200 will be briefly described below. The display panel 200 may include a substrate 201, the self light emitting device 230 above the substrate 201, and the photosensor 240. However, the structure of the display panel 200 is not limited thereto and thus, as illustrated in FIG. 2, the display panel 200 may further include a thin film transistor (TFT) 220 for controlling light emission of the self light emitting device 230 or other various components. Hereinafter, for convenience of description, a display panel having the structure illustrated in FIG. 2 will be described.

The substrate 201 may be formed of, e.g., one or more of glass, plastic, or metal. The TFT 220 and the photosensor 240 may be disposed on the substrate 201.

The TFT 220 may include source/drain electrodes 223, a semiconductor layer 227, and a gate electrode 221, and the display panel 200 may further include a gate insulating layer 213 and an interlayer dielectric layer 215 which may be designed to insulate the source/drain electrodes 223 and the semiconductor layer 227 from the gate electrode 221. In addition, for various purposes, e.g., for preventing impurities from entering the semiconductor layer 227, a buffer layer 211 may be formed on the entire surface of the substrate 201.

The photosensor 240 may have various structures. For example, as illustrated in FIG. 2, the photosensor 240 may have a structure similar to that of the TFT 220. The photosensor 240 may have metal layers 243 and a semiconductor layer 247, wherein an electric signal may be generated between the metal layers 243 when light is incident on the semiconductor layer 247.

A protective layer or a planarization layer 217 may be disposed to cover the TFT 220 and the photosensor 240. The self light emitting device 230 may be disposed on the planarization layer 217. As illustrated in FIG. 2, a pixel defining layer 219 may be disposed to define a region of each pixel. The self light emitting device 230 may be an organic light emitting diode (OLED), as illustrated in FIG. 2. When the self light emitting device 230 is an OLED, the self light emitting device 230 may include a pixel electrode 231, a counter electrode 235 facing the pixel electrode 231, and an intermediate layer 233 between the pixel electrode 231 and the counter electrode 235. The intermediate layer 233 may include an emissive layer.

The pixel electrode 231 may be a transparent electrode or a reflective electrode. When the pixel electrode 231 is a transparent electrode, the pixel electrode 231 may be formed of, e.g., one or more of ITO, IZO, ZnO, and $In_2O_3$. When the pixel electrode 231 is a reflective electrode, the pixel electrode 231 may include a reflective film formed of, e.g., one or more of Ag, Mg, Al, Pt, Pd, Au, Ni, Nd, Ir, Cr, or compounds thereof, and a layer formed of, e.g., one or more of ITO, IZO, ZnO, and $In_2O_3$, on the reflective film. The pixel electrode 231 may not be limited thereto and, thus, may be formed of various other materials. The pixel electrode 231 may have a single-layered or a multi-layered structure.

The counter electrode 235 may be a transparent electrode or a reflective electrode. When the counter electrode 235 is a transparent electrode, the counter electrode 235 may have a layer formed of metals having low work function, e.g., one or more of Li, Ca, LiF/Ca, LiF/Al, Al, Ag, Mg or compounds thereof, and a transparent conductive layer, e.g., one or more of ITO, IZO, ZnO or $In_2O_3$. When the counter electrode 235 is a reflective electrode, the counter electrode 235 may be a layer formed of, e.g., one or more of Li, Ca, LiF/Ca, LiF/Al, Al, Ag, Mg or compounds thereof. The structure and materials forming the counter electrode 235 are not limited thereto and may vary.

The intermediate layer 233 may be formed of small molecular weight materials or polymer materials. If small molecular weight materials are used, for example, the intermediate layer 233 may be formed by stacking a hole injection layer (HIL), a hole transport layer (HTL), an emission layer (EML), an electron transport layer (ETL), and an electron injection layer (EIL) in a single-layer or a multilayer structure, and various organic materials, e.g., copper phthalocyanine (CuPc), N,N'-Di(naphthalene-1-yl)-N,N'-diphenyl-benzidine (NPB), tris-8-hydroxyquinoline aluminum (Alq3), and the like may be used. These layers may be formed by using a vacuum deposition method. In the case where polymer materials are used, for example, the intermediate layer 233 may have a structure formed of an HTL and an EML. In this regard, to form the intermediate layer 233, poly(3,4-ethylenedioxythiophene) (PEDOT) may be used as the HTL, and poly-phenylenevinylene (PPV)-based polymer materials and polyfluorene-based polymer materials may be used as the EML. The HTL and the EML may be formed by using a screen printing method or an ink-jet printing method. However, the structure of the intermediate layer 233 is not limited thereto and may vary.

An encapsulation substrate 250 may be disposed above the self light emitting device 230, so that the stylus pen 100 may contact the encapsulation substrate 250.

The stylus pen 100 may have the end portion for contacting the touch screen, i.e., a top surface 250a of the encapsulation substrate 250 in FIG. 2, wherein the end portion may include the reflecting unit 110. Accordingly, when the flat panel display apparatus is used, i.e., when a display screen (that is, the touch screen) of the display panel 200 is touched by the stylus pen 100, at least some of the light emitted from inside the display apparatus may be reflected from the reflecting unit 110 of the stylus pen 100 and returned into the display panel 200. For example, the reflective surface 110a of the reflecting unit 110 may contact, e.g., be positioned entirely and directly on, the top surface 250a of the display panel 200. For example, the reflecting unit 110 may have a cross-section similar to that of a right trapezoid, e.g., side surfaces of the reflecting unit 110 may be substantially parallel to each other and have different lengths with the reflective surface 110a slanted at a predetermined angle therebetween, so upon contact between the reflective surface 110a and the top surface 250a, an angle between the stylus pen 100 and the top surface 250a may be a non-right angle.

In contrast, when a conventional stylus pen contacts a conventional display screen, some of the light emitted from an inside of the display apparatus may be absorbed by the conventional stylus pen, so that the amount of light returning to the conventional panel display may be insufficient to allow the internal photosensors in the panel display to perform the touch sensing.

Therefore, when the flat panel display apparatus according to embodiments includes the stylus pen 100, light emitted from the display panel 200, e.g., light emitted from the self light emitting device 230 and illustrated by arrows in FIG. 2, may be incident on the end portion of the stylus pen 100, e.g., on the reflective surface 110a of the reflecting unit 110. Since the reflective surface 110a may be formed of a reflecting material, light incident thereon may not be absorbed by the stylus pen 100 but may be efficiently reflected from the reflecting unit 110 back into the display panel, e.g., toward the photosensor 240 as illustrated in FIG. 2. By doing so, the amount of light reflected from the reflecting unit 110 of the stylus pen 100 and returning into the display panel 200 may be substantially increased so that the photosensor 240 may more accurately sense the light and detect whether the stylus pen 100 contacts the top surface 250a and a contact position thereof.

Further, as illustrated in FIG. 2, by allowing the reflecting unit 110 to have a reflective surface 110a, the light externally emitted from the display panel 200 and incident on the end portion of the stylus pen 100 may not be absorbed by the end portion of the stylus pen 100 but may be efficiently reflected from the reflecting unit 110. In particular, by allowing the reflecting unit 110 to have the reflective surface 110a having a flat shape as illustrated in FIG. 2, when the end portion of the stylus pen 100 contacts the touch screen (the top surface 250a of the encapsulation substrate 250), the reflective surface 110a of the reflecting unit 110 may be flat against a surface of the touch screen. By allowing the reflective surface 110a of the reflecting unit 110 to be flat against the surface of the touch screen when the end portion of the stylus pen 100 contacts the touch screen, the reflective surface 110a of the end portion of the stylus pen 100 may closely contact the surface of the touch screen so that the light incident on the end portion of the stylus pen 100 may be reflected from the end portion and returned into the display panel 200 without being externally dispersed.

Figure 3:
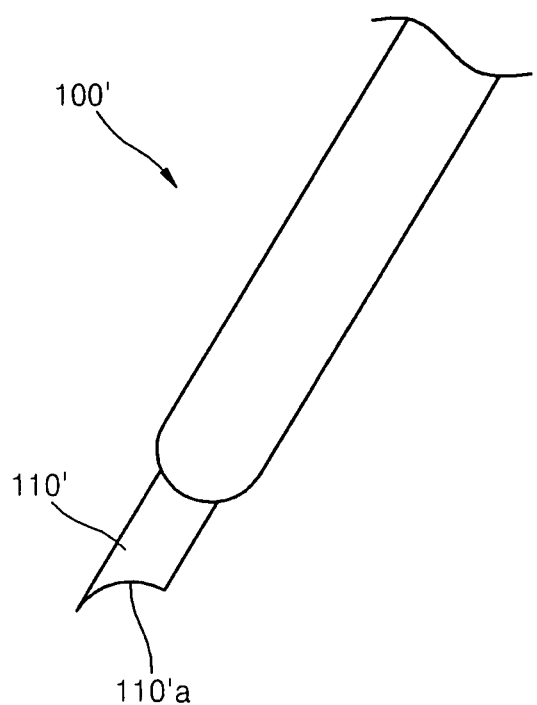
FIG. 3 illustrates a perspective view of a part of a stylus pen according to another embodiment.

FIG. 3 illustrates a perspective view of a part of a stylus pen 100' according to another embodiment. Compared to the stylus pen 100 of FIG. 1, the stylus pen 100' according to an embodiment may be different in that a reflecting unit 110' thereon may have a different structure of a reflective surface. In particular, the reflecting unit 110' in FIG. 3 may include an inwardly curved, i.e., with respect to the reflecting unit 110', reflective surface 110'a. The reflective surface 110'a may be a concave surface so that when an end portion of the stylus pen 100' contacts a touch screen, the curved surface 110'a of the reflecting unit 110' may converge at least some light emitted from an inside of a display apparatus, e.g., flat display panel, and may reflect some of the light toward the inside of the display apparatus. In this manner, the amount of light returning into the inside of the display apparatus with touch screen, in particular, the amount of light returning into a photosensor of the display apparatus, may be increased to allow the photosensor to accurately detect whether the stylus pen 100' is touched and a touch position thereof. For example, the reflective surface 110'*a* may be curved asymmetrically, so that side surface of the reflecting unit 110', i.e., surfaces adjacent the reflective surface 110'*a*, may have different lengths.

Figure 4:
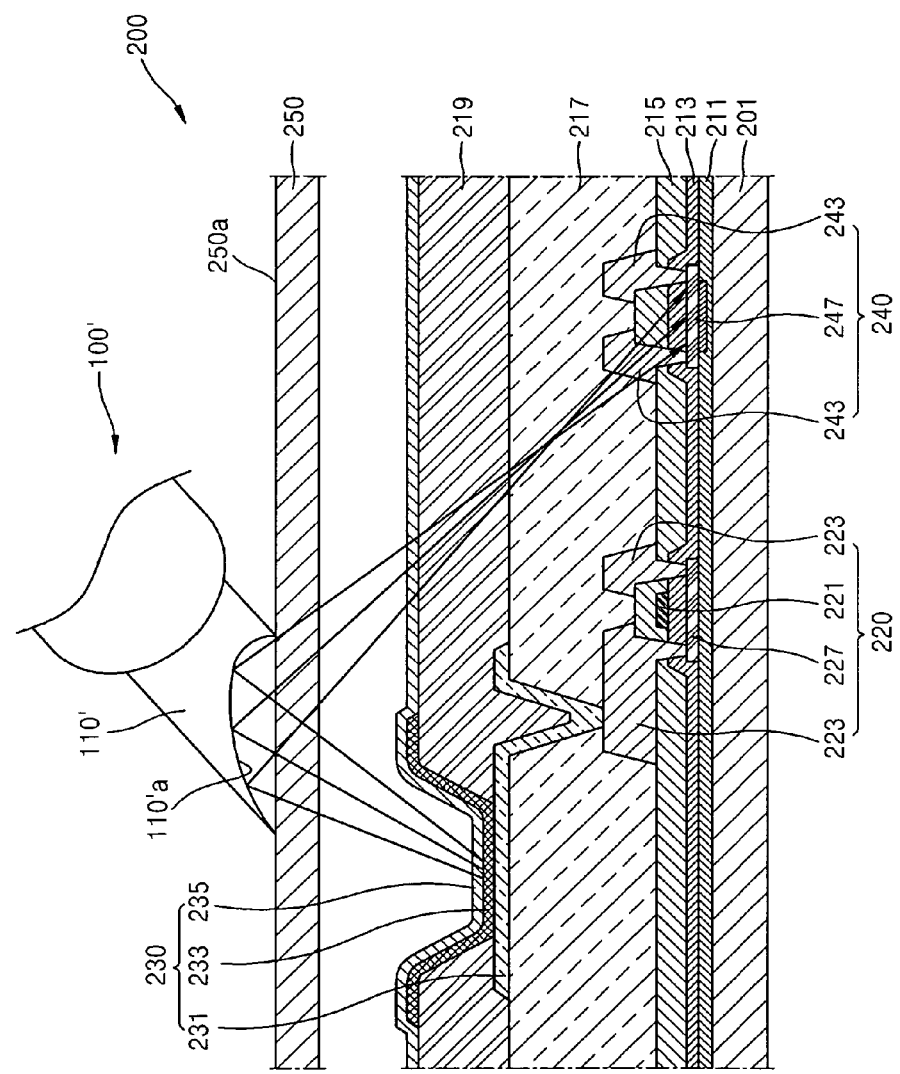
FIG. 4 illustrates a cross-sectional view of a part of a flat panel display apparatus including the stylus pen of FIG. 3.

FIG. 4 illustrates a cross-sectional view of a part of the display panel 200 with the pen stylus 100'. In particular, compared to the flat panel display apparatus of FIG. 2, the flat panel display apparatus in FIG. 4 may include the stylus pen 100' with the reflecting unit 110' having the concave reflective surface 110'*a*. Therefore, when the end portion of the stylus pen 100' contacts the touch screen of the display panel 200, the concave reflective surface 110'*a* of the reflecting unit 110' may contact the top surface 250*a*, e.g., only edges of the reflective surface 110'*a* may contact the top surface 250*a* to define a space between the curved surface and the top surface 250*a*, to converge at least some of the light generated and emitted by the self light emitting device 230 of the display panel 200, and then may reflect some of the light toward the inside the display panel 200. For example, the entire reflective surface 110'*a* may face the top surface 250*a*. In this manner, the amount of light returning into the display panel 200, in particular, the amount of light returning into the photosensor 240 of the display panel 200 may be increased, so that the photosensor 240 may more accurately detect whether the stylus pen 100' is touched and a touch position thereof.

According to embodiments, a stylus pen and a flat panel display apparatus including the stylus pen, capable of increasing a light receiving accuracy in the photosensor of the flat panel display apparatus, may be realized when the stylus pen is used with the flat panel display apparatus having touch screen capabilities.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A stylus pen, comprising:
    a body portion; and
    an end portion on the body portion, the end portion including a reflecting unit with a reflective surface, the reflective surface being concave with respect to the reflecting unit and directly facing a touch screen, upon contact between the stylus pen and the touch screen,
    wherein the reflecting surface is formed of one unit and, when the stylus pen contacts the touch screen, only edges of the reflecting surface contact the touch screen to define an empty space between the reflective surface and the touch screen.

2. The stylus pen as claimed in claim 1, wherein the reflecting unit includes a reflective material reflecting visible light.

3. The stylus pen as claimed in claim 2, wherein the entire reflecting surface includes the reflective material.

4. The stylus pen as claimed in claim 1, wherein the reflecting unit is oriented to have the body portion and the reflective surface at opposite edges thereof.

5. The stylus pen as claimed in claim 1, wherein the entire reflective surface is reflective.

6. The stylus pen as claimed in claim 1, wherein the reflective surface is positioned at non-right angles with respect to side surfaces of the reflecting unit, the side surfaces of the reflecting unit extending from the body portion and being adjacent to the reflective surface.

7. The stylus pen as claimed in claim 1, wherein the reflecting surface is an outermost surface of the reflecting unit, the entire reflecting surface directly facing the touch screen and being completely continuous between the edges contacting the touch screen.

8. A flat panel display apparatus, comprising:
    a display panel having a touch screen, the display panel including a self light emitting device and a photosensor; and
    a stylus pen, the stylus pen including:
        a body portion, and
        an end portion on the body portion, the end portion including a reflecting unit with a reflective surface, the reflective surface being concave with respect to the reflecting unit and directly facing the touch screen and only edges of the reflective surface contacting the touch screen, upon contact between the stylus pen and the touch screen.

9. The flat panel display apparatus as claimed in claim 8, wherein the entire reflective surface is reflective.

10. The flat panel display apparatus as claimed in claim 8, wherein the reflective surface is positioned at non-right angles with respect to side surfaces of the reflecting unit, the side surfaces of the reflecting unit extending from the body portion and being adjacent to the reflective surface.

11. The flat panel display apparatus as claimed in claim 8, wherein the concave surface is configured to converge light incident thereon from the self light emitting device.

12. The flat panel display apparatus as claimed in claim 11, wherein, upon contact between the stylus pen and the touch screen, an entire edge of the reflective surface contacts the touch screen.

13. The flat panel display apparatus as claimed in claim 11, wherein, upon contact between the stylus pen and the touch screen, the entire reflective surface faces the touch screen.

14. The flat panel display apparatus as claimed in claim 11, wherein the entire reflective surface is concave between side surfaces of the reflecting unit, the side surfaces of the reflecting unit extending from the body portion and being adjacent to the reflective surface.

15. The flat panel display apparatus as claimed in claim 8, wherein, when the stylus pen contacts the touch screen, at least some light emitted by the self light emitting device is reflected by the reflecting unit toward the photosensor.

16. The flat panel display apparatus as claimed in claim 8, wherein the entire reflective surface directly faces the touch screen.

\* \* \* \* \*